Oct. 19, 1965  L. A. MISKIEWICZ  3,212,245
SAFETY SHIELD FOR VEGETATION CUTTING APPARATUS
Filed March 9, 1964                                      2 Sheets-Sheet 1

INVENTOR
LEONARD A. MISKIEWICZ
BY George E. Manias
AGENT

Oct. 19, 1965         L. A. MISKIEWICZ         3,212,245
SAFETY SHIELD FOR VEGETATION CUTTING APPARATUS
Filed March 9, 1964                                   2 Sheets-Sheet 2
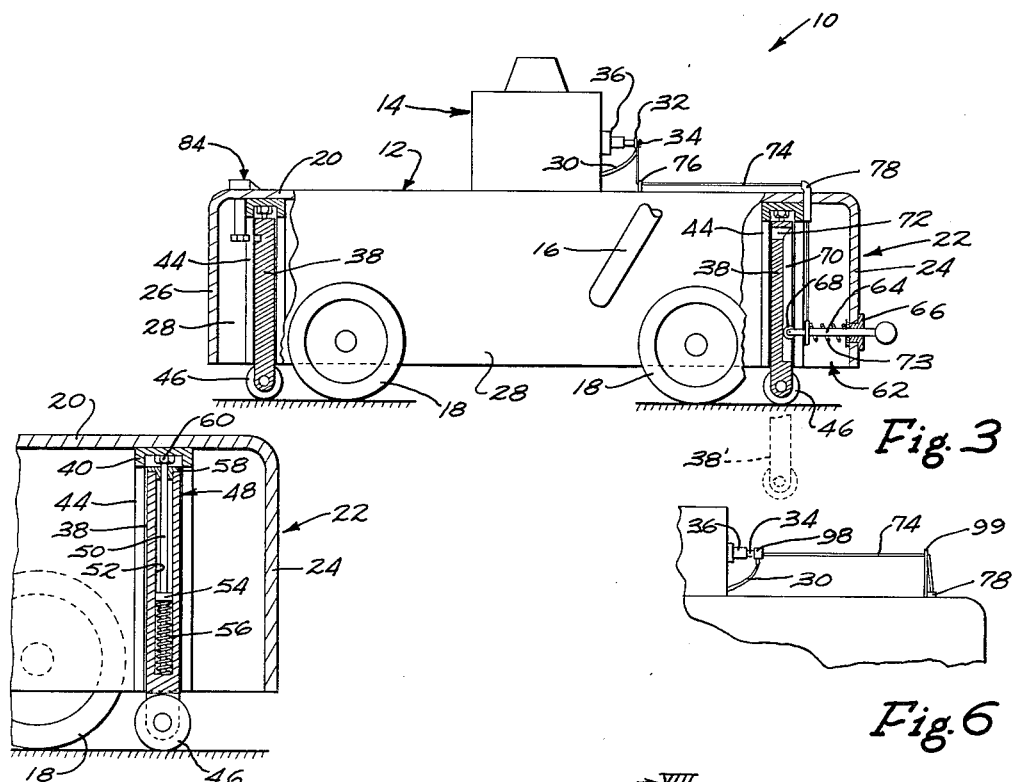
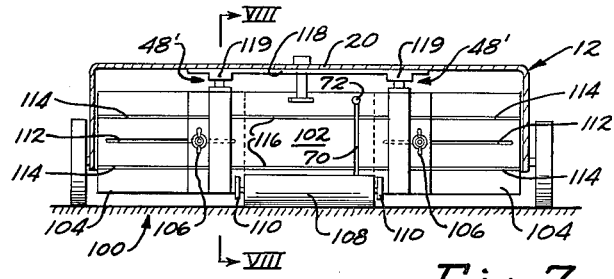
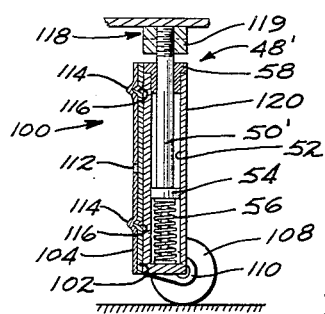
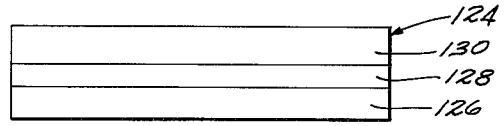
INVENTOR
LEONARD A. MISKIEWICZ

United States Patent Office 3,212,245
Patented Oct. 19, 1965

3,212,245
SAFETY SHIELD FOR VEGETATION CUTTING
APPARATUS
Leonard A. Miskiewicz, 219 Sprucewood St.,
Pittsburgh, Pa.
Filed Mar. 9, 1964, Ser. No. 350,502
12 Claims. (Cl. 56—25.4)

This application is a continuation-in-part of my co-pending application Serial No. 289,775, filed June 17, 1963, now abandoned.

This invention relates to a safety shield for use with powered vegetation cutting apparatus adapted to move over the ground, and more particularly to safety shield attachments particularly adapted for mounting on a conventional power lawn mower of the rotary type and extendible therefrom upon raising of the mower housing above the ground.

As an overall object, the present invention seeks to provide a safety shield attachment for lawn mowers of the rotary type which will prevent the accidental insertion of the feet or other portions of a person beneath the mower and into the path of the rotary blades thereof.

Another object of the invention is to provide means for maintaining the accidentally inserted foot or the like, spaced from the rotary blades of the mower.

Still another object of the invention is to provide simplified means for halting the operation of the power mower upon raising of the mower housing a predetermined distance above the ground.

A further object of the invention is to provide a safety shield attachment which may be readily mounted to the mower housing and whose width may be adjusted to correspond to the width of the mower housing.

A still further object of the invention is to provide a safety shield attachment which is mounted entirely within the mower housing wherein it cannot interfere with the operator.

Another object of the invention is to provide a safety shield attachment which prevents debris, such as, stones, twigs and the like, propelled by the rotary blades of the power mower from striking the operator.

Yet another object of the invention is to provide a safety shield attachment which will displace large sized debris from the path of travel of the power mower thereby preventing their entry into the region of the rotary blades for preventing damage of the rotary blades.

Still another object of the invention is to provide a signal, visible to the operator, for warning him of the position of the safety shield attachment with respect to the mower housing.

These and other objects and advantages of the present invention will become apparent from the following detailed description by reference to the accompanying drawings, in which:

FIG. 3 is a cross-sectional view, taken along the line III—III of FIG. 1, further illustrating the apparatus of FIG. 1;

FIG. 4 is a cross-sectional view taken along the line IV—IV of FIG. 1;

FIG. 6 is a fragmentary side view illustrating an alternative means for stopping the operation of the power mower;

FIG. 7 is a cross-sectional view, similar to FIG. 1, illustrating an alternative embodiment of the present safety shield attachment;

FIG. 8 is a cross-sectional view, taken along the line VIII—VIII of FIG. 7, further illustrating the safety shield attachment of FIG. 7; and FIG. 9 is a schematic illustration of the present shield member provided with a visual signal.

According to the present invention, there is provided a safety shield attachment which is mounted within the mower housing and supported therein for vertical reciprocal movement substantially parallel to a depending peripheral wall of the housing. Means is provided for urging the shield downwardly toward the ground whereby roller means mounted on the shield are engaged with the ground. The roller means support the shield for movement over the ground.

The present shield is adapted to be mounted, for example, on the back end of a power mower and entirely within the mower housing. The shield is so positioned and supported whereby when the mower is either intentionally or accidentally raised through a predetermined distance above the ground while the motor is in operation, the shield will be maintained engaged with the ground thereby shielding the rotary blades. Upon further upward movement of the housing, a locking mechanism is actuated to lock the shield in its maximum extended position. In this position, the shield serves as an effective means for maintaining an accidentally inserted foot or the like engaged thereon, spaced from the rotary blades. Just prior to reaching its maximum extended position, the shield actuates a stopping mechanism connected to the power mower for halting the operation of the power mower.

Further in accordance with the invention, a shield member may be mounted on the front end of the mower as well as the back end of the mower. With this construction any small stones, twigs and the like which are propelled by the rotary blade of the mower will be deflected by the rear shield member, for example, and thereby prevented from striking the operator. Furthermore, the front shield member will be continuously vibrated by the action of the mower power means. Hence, the front shield member will displace any large debris out of the path of travel of the mower to prevent their entry into the region of blades thereby preventing their damage.

Figure 1:
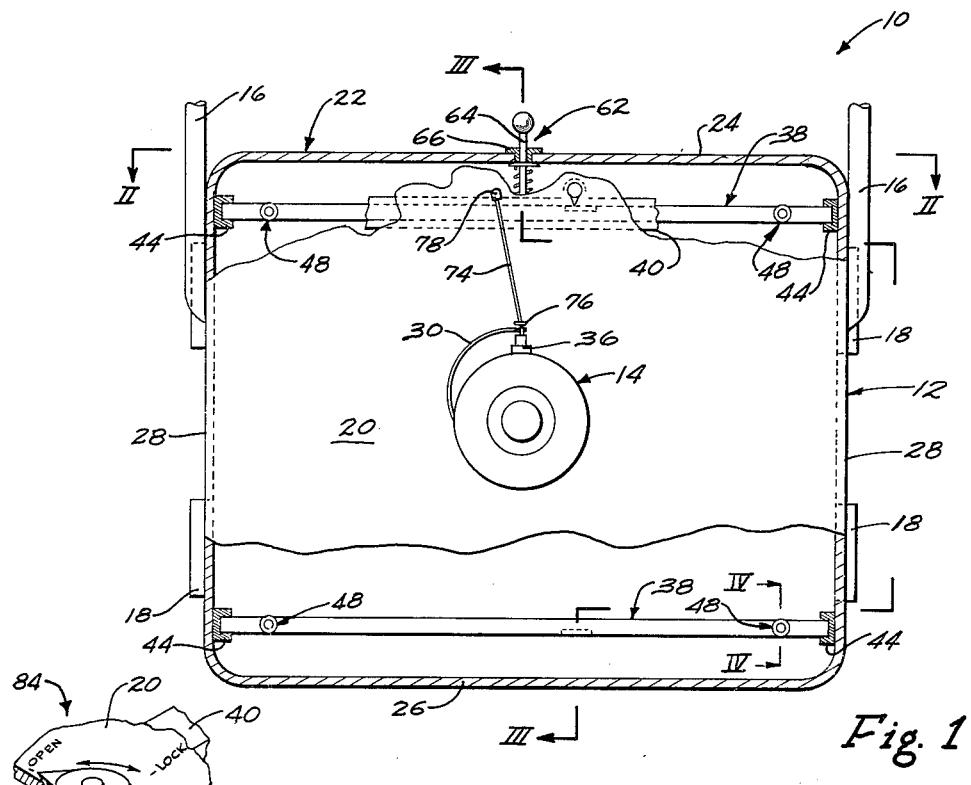
FIGURE 1 is a plan view, with portions broken away to show details, of a rotary-type power lawn mower provided with the safety shield attachment of the present invention.
Figure 2:
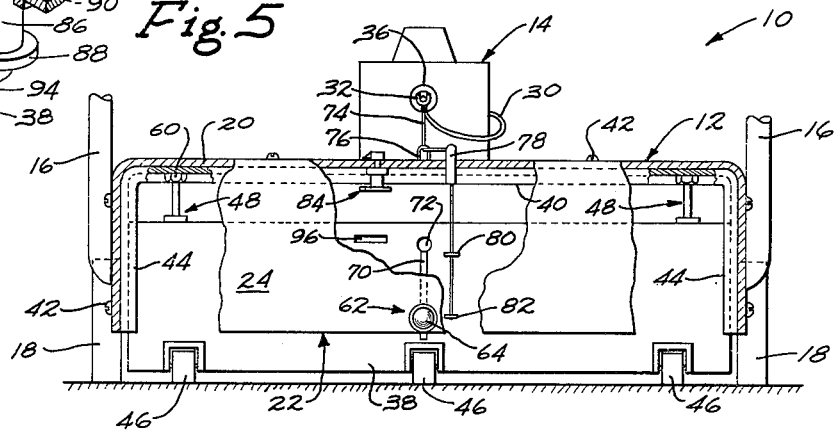
FIG. 2 is an elevation view of the apparatus of FIG. 1 as viewed from the line II—II of FIG. 1.

Referring now to FIGS. 1 to 3, there is illustrated a power mower 10 having a housing 12, a power means 14, an operational handle 16 and four movable wheels 18. It is to be understood that the configuration of the power mower 10 is intended as illustrative of one such device and that of the safety shield attachment and associated elements of the present invention may be mounted on other power mowers of different configurations as well as on other vegetation cutting apparatus.

The housing 12 comprises a generally horizontal upper wall 20 and a peripheral wall 22 depending therefrom.

The peripheral wall 22 comprises a rear wall portion 24, front wall portion 26 and side wall portions 28. Within the housing 12, there is disposed a rotary blade (not shown) employed herein for cutting grass.

The power means 14 has associated therewith an electrical conductor 30 having a clip 32 at its end for detachably securing the conductor 30 to a terminal pole 34 of a spark plug 36. As is known, the electrical conductor 30 serves to carry an electric current from a magneto to the spark plug 36.

The power mower 10 is provided with a pair of shield members 38 preferably formed from lightweight wood, plastic and the like. One of the shield members 38 is positioned adjacent to the rear wall portion 24 and the other of the shield members 38 is positioned adjacent to the front wall portion 26. A generally U-shaped bracket 40, one each for each of the shield members 38, is secured by means of fasteners 42 to the inner surface of the housing 12. The bracket 40 preferably is formed from lightweight material and has a channel-shaped transverse cross section. The bracket 40 thus provides guide means comprising vertical legs 44 threof into which the ends of the shield members 38 reside and by which the shield members 38 are guided during its vertical reciprocal movement relative to the housing 12. Rotatably mounted on the lower edge of the shield member 38 are rollers 46 which support the shield member 38 spaced from the ground and which facilitate the movement of the shield member 38 over the ground.

Each of the shield members 38 is resiliently urged toward the ground by means of pushers 48 which act on the bracket 40. As can be seen in FIG. 4, each pusher 48 may comprise a rod member 50 projecting from a bore 52, provided in the shield member 38, into engagement with the bracket 40. The rod member 50 includes a radial flange 54 disposed centrally thereof and adapted to retain a spring 56 within the bore 52. A plug 58 is disposed in the upper end of the bore 52 and is positioned for engagement by the radial flange 54 during upward movement to the rod member 50.

The upper end of the rod member 50 preferably is threaded into a nut 60 secured to the bracket 40, for example, by means of brazing or welding. Hence, the downward movement of the shield member 38 is limited by the engagement of the radial flange 54 with the plug 58. The spring 56, being compressed between the radial flange 58 and the bottom wall of the bore 52, serves to urge the shield member 38 downwardly toward the ground and, hence, maintain the rollers 46 engaged with the ground.

Referring again to FIGS. 1, 2 and 3, a lock means 62 is provided for locking the shield member 38, associated with the rear wall portion 24, in its maximum extended position as illustrated by the dotted outline numbered 38' in FIG. 3. The lock means 62 comprises a pin member 64 extending through a support bushing 66 provided in the rear wall portion 24. The pin member 64 includes a roller 68 or the like which is movable in a vertical groove 70 cut in the shield member 38 and adapted to enter an opening 72 formed in and adjacent to the upper edge of the shield member 38. A relatively weak spring 73, surrounding the pin member 64, urges the pin member 64 into engagement with the groove 70 and into the opening 72 when disposed opposite thereto.

As stated above, means is provided for halting the operation of the power means 14 just prior to the time when the shield member 38 reaches its maximum extended position 38' (FIG. 3). This means comprises a cable 74 having one end secured to the clip 32 of the electrical conductor 30, and extending therefrom vertically downwardly through an eye 76 to a conduit 78 which directs the cable 74 downwardly between the rear wall portion 24 and the shield member 38. As can best be seen in FIG. 2, the cable 74 extends through a second eye 80 secured to the shield member 38 at a predetermined point below the opening 72 and terminates in an enlarged end portion 82.

When the back portion of the mower 10 is raised, the shield member 38, associated therewith, remains engaged with the ground. However, as the mower 10 is raised, the second eye 80 is moved toward the enlarged end portion 82. Upon continued raising of the mower 10, the end portion 82 will engage the second eye 80 whereupon the clip member 32 is pulled and disconnected from the terminal pole 34 thereby halting the operation of the power means 14. Immediately thereafter, the pin memmer 64 enters the opening 72 to lock the shield member 38 in its maximum extended position 38' (FIG. 3).

It should be understood at this time that the distance between the lower edge of the shield member 38, when in its maximum extended position 38' and the rotary blades (not shown) is such that the shield member 38 will maintain, for example, the toes of a foot engaged on the lower edge portion of the shield member 38, spaced from the rotary blades. Hence, in the present invention, the shield members 38 when locked in their maximum extended position 38', cannot be displaced into the housing 12. It should also be understood that the combined force of the spring members 56 can only be overcome by a concentrated effort on the part of the operator. Furthermore, when the shield member is locked in its maximum extended position 38' and has the roller members 46 engaged with the ground, the mower 10 will be inclined with respect to the ground. Hence, should the legs of the operator be accidentally inserted between the ground and the lower edge of the shield member 38, the mower 10 will be further inclined with respect to the ground and, hence, the rotary blades thereof will be spaced from the feet of the operator by a safe distance.

Figure 5:
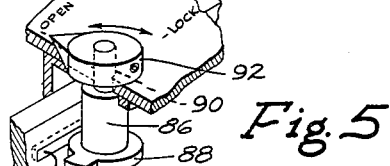
FIG. 5 is a fragmentary isometric view illustrating a locking means for the present safety shield attachment.

In order to facilitate transportation of the mower 10, temporary lock means 84 are provided for each of the shield members 38. As best seen in FIGS. 2 and 5, the locking means 84 may comprise a main body portion 86 secured to the bracket 40, and having a flange 88 at its lower end and a shaft 90 at its upper end which projects through the upper wall 20 of the housing 12. A positioning knob 92 is secured to the shaft 90 and serves to indicate the condition of the lock means 84, i.e., either "locked" or "unlocked." The flange 88 includes a lug 94 which is positioned to enter a groove 96 formed in an appropriate position in the shield member 38. Thus, clockwise rotation of the knob 92 locks the shield member 38 in a raised position thereby preventing the shield member from lowering when it is desired to load the power mower 10, for example, into a car or truck.

As shown in FIG. 6, the electrical conductor 30 sometimes is provided with a cap 98 which is snapped over the terminal pole 34 of the spark plug 36, in much the same manner as in automobile engines. In this instance, the cable 74 is secured to the cap 98 and preferably extends horizontally therefrom through an elevated eye 98 and thence down through the conduit 78. The method of disconnecting the cap 98 from the terminal pole 34 is the same as that described above for the clip 32 (FIG. 3).

An alternative embodiment of the present shield member is illustrated in FIGS. 7 and 8 and is generally designated by the numeral 100. Corresponding numerals will be employed to identify corresponding parts already described.

In this embodiment, the shield member 100 comprises a main plate 102 having shield extension members 104, one each slideably secured to each side of the main plate 102 by means of fasteners 106 each of which preferably comprises a wing nut and a bolt. A roller member 108 is rotatably mounted on wing flanges 110 projecting from the main plate 102. A pair of pushers 48' are employed to bias the shield member 100 toward the ground thereby maintaining the roller member 108 engaged with the ground. As in the embodiment of FIGS. 1–3, the vertical groove 70 and the associated aperture 72 are provided to cooperate with the lock means 62 (not shown) as described above.

Each shield extension member 104 is provided with a central slot 112 through which the fasteners 106 extend and spaced-apart parallel grooves 114 which cooperate with similarly shaped grooves 116 formed in the main plate 102. The cooperating grooves 114, 116 serve to maintain the shield extension members 104 aligned with the main plate 102. Thus, the width of the shield member 100 may be adjusted to correspond with the width of the mower housing to which it is attached. In this embodiment, the pushers 48' serve not only to urge the shield member toward the ground, but also to guide it during its vertical reciprocal movement relative to the housing 12. Hence, a bracket 118, secured to the upper wall 20 of the housing 12 is provided with pads 119 into which are threaded the upper ends of the rod members 50'. Each of the pushers 48' includes a tubular conduit 120 into which are inserted the rod member 50', the spring member 56 and the plug 58. The radial flange 54 is slideably engaged with the inner wall of the tubular conduit 120 and cooperates with the engagement of the rod member 50' with the plug 58 to guide the shield member 100 during its up and down movement. The operation of the shield member 100 is identical to the operation of the shield member 38 described above in conjunction with FIGS. 1–5.

In FIG. 9 there is schematically illustrated a shield member 124 which may comprise either of the heretofore described shield members 38 or 100. The shield member 124 is provided with color bands 126, 128 and 130 which preferably comprise green, yellow and red respectively. The color bands 126, 128 and 130 are positioned to be visible by the operator to warn him of the position of the shield member 124 with respect to the mower housing. That is to say, with the shield member 124 installed in the back end of a mower, the green color band 126 will be visible to the operator when the mower has all four wheels engaged with the ground. When the rear of the mower is raised a predetermined distance above the ground the yellow color band 128 will come into view. Upon raising the rear of the mower further, the red color band comes into view and warns the operator that (1) the operation of the power means is about to be halted; and (2) the shield member is about to be locked in place.

Although the present invention has been shown in connection with certain specific embodiments, it will be readily apparent to those skilled in the art that various changes in form and arrangement of parts to suit requirements may be made without departing from the spirit and scope of the present invention. As for example, the shield members 38 or 100 may be inclined or they may be curved to correspond with the depending peripheral wall of the housing.

I claim as my invention:

1. In combination with vegetation cutting apparatus adapted to move over the ground, including a housing having a depending peripheral wall and power means for driving rotary blades disposed within said housing; a shield plate positioned within said housing and adjacent to a rear wall portion of said peripheral wall, said shield plate extending transversely of said housing and for substantially the entire width of said rear wall portion; guide means supporting said shield plate for reciprocal movement substantially parallel with said rear wall portion; means resiliently urging said shield member downwardly toward the ground; and roller means mounted on said shield plate for supporting the same for movement over the ground whereby said shield member will be maintained engaged with the ground during upward movement of said rear wall portion through a predetermined distance.

2. The combination of claim 1 including at least one shield extension member slideably secured to said shield member on one side thereof and adapted for horizontal movement relative thereto whereby the width of said shield member is adjustable to correspond substantially with the width of said rear wall portion of said housing.

3. In combination with vegetation cutting apparatus adapted to move over the ground, including a housing having a depending peripheral wall and power means for driving rotary blades disposed within said housing: a shield member positioned within said housing and adjacent to a rear wall portion of said peripheral wall and extending transversely of said housing for substantially the entire width of said rear wall portion, said shield member comprising a main plate and a pair of extension plates, one each slideably secured to each side of said main plate, said extension plates being movable horizontally whereby the width of said shield member is adjustable to correspond substantially with the width of said rear wall portion; a supporting member secured to said housing and extending parallel with said shield member; guide means extending between said supporting member and said shield member for guiding said shield member during vertical reciprocal movement relative to said housing; means resiliently urging said shield member downwardly toward the ground; and means mounted on said shield member and supporting said shield member for movement over the ground whereby said shield member will be maintained engaged with the ground during upward movement of said rear wall portion upwardly through a predetermined distance.

4. In combination with vegetation cutting apparatus adapted to move over the ground, including a housing having a depending peripheral wall and power means for driving rotary blades disposed within said housing: a shield member positioned within said housing and adjacent to a rear wall portion of said peripheral wall and extending transversely of said housing for substantially the entire width of said rear wall portion, said shield member comprising a main plate and a pair of extension plates, one each slideably secured to each end of said main plate, said extension plates being movable horizontally whereby the width of said shield member may be adjusted to correspond substantially with the width of said rear wall portion; a supporting member secured to said housing and extending parallel with said shield member; spaced-apart guide rods extending between said supporting member and said shield member for guiding said shield member during vertical reciprocal movement relative to said housing; spring means acting on said guide rods for resiliently urging said shield member downwardly toward the ground; and means mounted on said shield member for supporting said shield member for movement over the ground whereby said shield member is maintained engaged with the ground during movement of said rear wall portion upwardly through a predetermined distance.

5. In combination with vegetation cutting apparatus adapted to move over the ground, including a housing having a depending peripheral wall and power means for driving rotary blades disposed within said housing, said power means having associated therewith an electrical conductor detachably secured to a terminal pole thereof: a shield plate positioned within said housing and adjacent to a rear wall portion of said peripheral wall, said shield plate extending transversely of said housing for substantially the entire width of said rear wall portion; guide means supporting said shield plate for reciprocal movement substantially parellel with said rear wall portion; means resiliently urging said shield plate downwardly toward the ground; means mounted on said shield plate and supporting said shield member for movement over the ground; and means operatively connected with said shield plate and said electrical conductor for physically disconnecting said electrical conductor from said terminal pole to halt operation of said power means upon predetermined downward movement of said shield plate.

6. The combination of claim 5 wherein said means for disconnecting said electrical conductor comprises a cable secured at one end to said eletcrical conductor and extending therefrom to a point adjacent to the lower edge of said shield plate, and catch means mounted on said shield plate for pulling said cable only after downward movement of said shield plate through a predetermined istance.

7. In combination with vegetation cutting apparatus adapted to move over the ground, including a housing having a depending peripheral wall and power means for driving rotary blades disposed within said housing: a first shield plate positioned within said housing and adjacent to a rear wall portion of said peripheral wall; a second shield plate positioned within said housing and adjacent to a front wall portion of said peripheral wall; each said shield plate extending transversely of said housing for substantially the entire width of their adjacent wall portions; means individual to said shield plate for supporting each of said shield plates for reciprocal movement substantially parallel to its associated wall portion; means resiliently urging each of said shield plates downwardly toward the ground; and roller means individual to said shield plates for supporting the same for movement over the ground; said first and second shield plates being movable independently of each other whereby lifting of one of said wall portions will cause the associated shield plate to project downwardly therefrom.

8. In combination with vegetation cutting apparatus adapted to move over the ground, including a housing having a depending peripheral wall and power means for driving rotary blades disposed within said housing: a shield member positioned within said housing and adjacent to a rear wall portion of said peripheral wall, said shield member extending transversely of said housing for substantially the entire width of said rear wall portion; guide means supporting said shield member for vertical reciprocal movement relative to said housing; means resiliently urging said shield member downwardly toward the ground; means mounted on said shield member and supporting the same for movement over the ground whereby said shield member will be maintained engaged with the ground during upward movement of said rear wall portion through a predetermined distance; and lock means extending between said shield member and said rear wall portion for locking said shield member in a fixed position relative to said housing upon downward movement of said shield through a predetermined distance .

9. In combination with vegetation cutting apparatus adapted to move over the ground, including a housing having a depending peripheral wall and power means for driving rotary blades disposed within said housing: a shield member positioned within said housing and adjacent to a rear wall portion of said peripheral wall, said shield member extending transversely of said housing for substantially the entire width of said rear wall portion; guide means supporting said shield member for vertical reciprocal movement relative to said housing; means resiliently urging said shield member downwardly toward the ground; means mounted on said shield member and supporting the same for movement over the ground whereby said shield member will be maintained engaged with the ground during upward movement of said rear wall portion through a predetermined distance; and lock means extending between said shield member and said rear wall portion for locking said shield member in a fixed position relative to said housing upon downward movement of said shield through a predetermined distance, said lock means comprising a pin member projecting through said rear wall portion into engagement with said shield member, spring means acting on said pin member for urging said pin member into engagement with said shield member, and said shield member having an aperture formed therein adapted to receive the end of said pin member, said pin member and said aperture being positioned relative to one another for locking engagement only after movement of said shield member through a predetermined vertical distance.

10. In combination with vegetation cutting apparatus adapted to move over the ground, including a housing having a depending peripheral wall and power means for driving rotary blades disposed within said housing: a shield member positioned within said housing and adjacent to a rear wall portion of said peripheral wall, said shield member extending transversely of said housing for substantially the entire width of said rear wall portion; guide means supporting said shield member for vertical reciprocal movement relative to said housing; means resiliently urging said shield member downwardly toward the ground; and means mounted on said shield member and supporting the same for movement over the ground whereby said shield member will be maintained engaged with the ground during upward movement of said rear wall portion through a predetermined distance; lock means extending between said shield member and said rear wall portion for locking said shield member in a fixed position relative to said housing upon downward movement of said shield member through a predetermined distance, said lock means comprising a pin member projecting through said rear wall portion into engagement with said shield member, spring means acting on said pin member for urging said pin member into engagement with said shield member, said shield member having an aperture formed therein adapted to receive the end of said pin member, said pin member and said aperture being positioned relative to one another for locking engagement only after movement of said shield member through a predetermined vertical distance, and rotatable means at the end of said pin member and engaged with said shield member for minimizing the frictional resistance to movement between said pin member and said shield member.

11. In combination with vegetation cutting apparatus adapted to move over the ground, including a housing having a depending peripheral wall and power means for driving rotary blades disposed within said housing, said power means having associated therewith an electrical conductor detachably secured to a terminal pole thereof: a shield member positioned within said housing and adjacent to a rear wall portion of said peripheral wall, said shield member extending transversely of said housing for substantially the entire width of said rear wall portion; guide means supporting said shield member for vertical reciprocal movement relative to said housing; means resiliently urging said shield member downwardly toward the ground; means mounted on said shield member and supporting said shield member for movement over the ground; means operatively connected with said shield member and said electrical conductor for disconnecting said electrical conductor to halt operation of said power means upon a predetermined downward movement of said shield member; and lock means extending between said rear wall portion and said shield member for locking said shield member in a fixed position relative to said housing upon downward movement of said shield member through a second predetermined distance, said lock means being operable only after the operation of said power means has been halted.

12. In combination with vegetation cutting apparatus adapted to move over the ground, including a housing having a depending peripheral wall and power means for driving rotary blades disposed within said housing: a shield plate positioned adjacent to a rear wall portion of said peripheral wall, said shield plate extending transversely of said housing for substantially the entire width of said rear wall portion; means carried by said housing for supporting said shield plate for reciprocal movement substantially parallel with said rear wall portion; means resiliently urging said shield plate downwardly toward the ground; and means mounted on said shield plate and supporting the same for movement over the ground whereby said shield plate will be maintained engaged with the ground during upward movement of said rear wall portion through a predetermined distance.

References Cited by the Examiner

UNITED STATES PATENTS

| | | | |
|---|---|---|---|
| 2,578,880 | 12/51 | Doyle | 56—25.4 |
| 2,629,222 | 2/53 | Johnston | 56—249 |
| 2,636,332 | 4/53 | Cole | 56—249 |
| 2,973,613 | 3/61 | Hagedorn | 56—25.4 |
| 3,057,140 | 10/62 | Ridenour et al. | 56—255 X |

ABRAHAM G. STONE, *Primary Examiner.*

ANTONIO F. GUIDA, *Examiner.*